United States Patent
Nayak et al.

(10) Patent No.: US 11,038,953 B1
(45) Date of Patent: Jun. 15, 2021

(54) DYNAMIC EGRESS TRAFFIC STEERING FOR LARGE SCALE CLOUD NETWORK

(71) Applicant: Microsoft Technology Licensing, LLC, Redmond, WA (US)

(72) Inventors: Mahesh Kumar Nayak, Kirkland, WA (US); Yi Li, Bellevue, WA (US); Brian Drew Lehr, Seattle, WA (US); Gary Randall Ratterree, Kirkland, WA (US); Jeffrey Todd Cohen, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/857,391

(22) Filed: Apr. 24, 2020

(51) Int. Cl.
*G06F 15/173* (2006.01)
*H04L 29/08* (2006.01)
*H04L 12/24* (2006.01)

(52) U.S. Cl.
CPC ........ *H04L 67/101* (2013.01); *H04L 41/0654* (2013.01)

(58) Field of Classification Search
CPC .................. H04L 67/101; H04L 41/0654
See application file for complete search history.

(56) References Cited

U.S. PATENT DOCUMENTS

| | | | | |
|---|---|---|---|---|
| 6,317,792 B1 * | 11/2001 | Mundy | ................ | H04L 12/14 709/227 |
| 2003/0036970 A1 * | 2/2003 | Brustoloni | .......... | H04L 47/2491 709/240 |
| 2005/0089015 A1 * | 4/2005 | Tsuge | .................. | H04L 45/04 370/351 |
| 2006/0104299 A1 * | 5/2006 | Vazquez Castro | ...... | H04L 47/50 370/412 |
| 2006/0193247 A1 * | 8/2006 | Naseh | ................ | H04L 45/28 370/216 |
| 2006/0193252 A1 * | 8/2006 | Naseh | ................ | H04L 45/28 370/225 |
| 2006/0195607 A1 * | 8/2006 | Naseh | ............ | H04L 67/1008 709/238 |
| 2009/0080336 A1 * | 3/2009 | Zhang | ................. | H04L 43/00 370/248 |
| 2012/0110089 A1 * | 5/2012 | Wang | .................. | H04L 45/02 709/205 |
| 2018/0375764 A1 * | 12/2018 | Filsfils | ................ | H04L 67/10 |

* cited by examiner

*Primary Examiner* — Richard G Keehn
(74) *Attorney, Agent, or Firm* — Ray Quinney & Nebeker, P.C.; Thomas M. Hardman; Sunah K. Lee

(57) ABSTRACT

Internet bound traffic that is being routed through a particular interface within an edge router can, under some circumstances, be moved to a different interface. In some situations, one or more Internet protocol (IP) flows can be moved to a different interface within the same edge router. In other situations, one or more IP flows can be moved to a different interface within a different edge router. Decisions to move Internet traffic to a different interface can be based on information about interfaces within the various edge routers in a cloud computing provider's network, information about IP flows that are being sent through the various interfaces, peering capacity information and information about the latency associated with particular Internet paths. Some or all of the information that is used in connection with traffic steering decisions can be based on real-time measurements.

20 Claims, 10 Drawing Sheets

DYNAMIC EGRESS TRAFFIC STEERING FOR LARGE SCALE CLOUD NETWORK

CROSS-REFERENCE TO RELATED APPLICATIONS

N/A

BACKGROUND

Cloud computing is the delivery of computing services (e.g., servers, storage, databases, networking, software, analytics) over the Internet. Broadly speaking, a cloud computing system includes two sections, a front end and a back end, that are in communication with one another via the Internet. The front end includes the interface that users encounter through a client device. The back end includes the resources that deliver cloud-computing services, including processors, memory, storage, and networking hardware.

Cloud-based solutions are growing at a very fast rate, which has caused the amount of Internet traffic to increase significantly. One challenge for cloud service providers is that the usage pattern for Internet traffic is unpredictable. Sudden spikes and dips make it difficult to plan capacity. Network congestion can cause network performance issues (e.g., packet drops, jitter). To address this problem, one option for cloud providers is to provision enough capacity to address unpredictable demand growth due to spikes and security threats, such as distributed denial of service (DDOS) attacks. This, however, comes at a very high cost. Moreover, even if cloud providers deploy enough capacity, issues such as faulty hardware can cause degraded performance.

A computer network operated by a cloud provider includes a plurality of Internet points of presence. An Internet point of presence (POP) includes a router, which may be referred to as an edge router. The edge router handles egress traffic (i.e., traffic that is leaving the cloud provider network and being sent to a destination on the Internet) as well as Internet ingress traffic (i.e., traffic that is entering the cloud provider network after originating somewhere on the Internet). The edge router can include a plurality of interfaces between the cloud computing provider's network and the Internet. The various interfaces can connect to networks operated by different Internet service providers (ISPs). Traffic that is being sent from a particular datacenter within the cloud provider network to some destination on the Internet is routed from the datacenter to an interface associated with one of the cloud provider's edge routers.

The edge routers within a cloud provider's network implement the Border Gateway Protocol (BGP), which is a routing protocol designed to exchange routing and reachability information among autonomous systems on the Internet. BGP makes routing decisions based on paths, network policies, or rule sets configured by a network administrator. Many cloud providers set default routing to cold-potato routing, in which ingress and egress traffic leaves the provider's network closest to users. The BGP protocol has no inherent concept of congestion or performance, so BGP takes the best path irrespective of network congestion or hardware failures. Therefore, degraded performance can occur during periods of heavy Internet traffic or when hardware failures have occurred at certain edge routers.

SUMMARY

In accordance with one aspect of the present disclosure, a system is disclosed that includes one or more processors, memory in electronic communication with the one or more processors, and instructions stored in the memory. The instructions are executable by the one or more processors to collect interface information about a plurality of interfaces within a plurality of edge routers in a network of a cloud computing provider. The plurality of edge routers handle egress traffic from the network of the cloud computing provider to destinations that are external to the network of the cloud computing provider. The plurality of interfaces are connected to a plurality of different networks operated by different Internet service providers. The interface information includes telemetry about performance of the egress traffic through the plurality of interfaces. The instructions are also executable by the one or more processors to obtain Internet protocol (IP) flow information about a plurality of IP flows that are being sent through the plurality of interfaces. The IP flow information includes information about data rates of the plurality of IP flows. The instructions are also executable by the one or more processors to determine, based at least in part on the interface information, that a first interface is experiencing degraded performance. The instructions are also executable by the one or more processors to identify, based at least in part on the IP flow information, an IP flow that is being routed through the first interface and that has a data rate in excess of a threshold value. The instructions are also executable by the one or more processors to select a second interface from among a candidate pool of available interfaces that are not experiencing degraded performance. The instructions are also executable by the one or more processors to determine that the second interface has capacity for the IP flow. The instructions are also executable by the one or more processors to cause the IP flow to be moved from the first interface to the second interface.

The system may further include additional instructions that are executable by the one or more processors to prevent the first interface from being added to the candidate pool of available interfaces for a defined time period.

Determining that the first interface is experiencing the degraded performance may include determining that the first interface is experiencing network congestion.

Determining that the first interface is experiencing the degraded performance may include determining that a number of packet drops experienced by the first interface exceeds a threshold value.

The interface information may include a log file generated by an edge router that includes the first interface. Determining that the first interface is experiencing the degraded performance may include processing the log file and determining, based at least in part on the log file, that the first interface has experienced a hardware failure.

The system may further include additional instructions that are executable by the one or more processors to determine that the priority level of the IP flow exceeds a threshold priority level.

The system may further include additional instructions that are executable by the one or more processors to determine latency information about latency associated with various Internet paths and determine, based at least in part on the latency information, that moving the IP flow to the second interface would not increase the latency of the IP flow.

The first interface and the second interface may both be included within a same edge router.

The first interface may be included within a first edge router that is located in a first geographical location. The second interface may be included within a second edge router that is located in a second geographical location. The second geographical location may be distinct from the first geographical location.

In accordance with another aspect of the present disclosure, a method is disclosed that includes collecting interface information about a plurality of interfaces within a plurality of edge routers in a network of a cloud computing provider. The plurality of edge routers handle egress traffic from the network of the cloud computing provider to the Internet. The plurality of interfaces are connected to a plurality of different networks operated by different Internet service providers. The interface information may include telemetry about packet drops that have been experienced by the egress traffic through the plurality of interfaces. The method further includes obtaining Internet protocol (IP) flow information about a plurality of IP flows that are being sent through the plurality of interfaces. The IP flow information includes information about data rates of the plurality of IP flows. The method further includes determining that a number of packet drops experienced by a first interface within a time interval exceeds a packet drop threshold value. The method further includes identifying, based at least in part on the IP flow information, an IP flow that is being routed through the first interface and that has a data rate in excess of a data rate threshold value. The method further includes selecting a second interface from among a candidate pool of available interfaces that are not experiencing degraded performance. The method further includes determining that the second interface has capacity for the IP flow. The method further includes causing the IP flow to be moved from the first interface to the second interface. The method further includes preventing the first interface from being added to the candidate pool of available interfaces for a defined time period.

The interface information may further include a log file generated by an edge router that includes the first interface. The method may further include determining, based at least in part on the log file, that the first interface has experienced a hardware failure. Causing the IP flow to be moved from the first interface to the second interface may be based at least in part on the hardware failure.

The method may further include determining that a priority level of the IP flow exceeds a threshold priority level.

The method may further include obtaining latency information about latency associated with various Internet paths and determining, based at least in part on the latency information, that moving the IP flow to the second interface would not increase the latency of the IP flow.

The first interface and the second interface may both be included within a same edge router.

The first interface may be included within a first edge router that is located in a first geographical location. The second interface may be included within a second edge router that is located in a second geographical location. The second geographical location may be distinct from the first geographical location.

In accordance with another aspect of the present disclosure, a method is disclosed for obtaining log files corresponding to a plurality of interfaces within a plurality of edge routers in a network of a cloud computing provider. The plurality of edge routers handle egress traffic from the network of the cloud computing provider to destinations that are external to the network of the cloud computing provider. The plurality of interfaces are connected to a plurality of different networks operated by different Internet service providers. The method further includes processing the log files to determine hardware failure information. The method further includes determining, based at least in part on the hardware failure information, that a first interface of an edge router is likely to experience a hardware failure. The method further includes obtaining Internet protocol (IP) flow information corresponding to IP flows that are being sent through the interfaces. The IP flow information may include information about data rates of the plurality of IP flows. The method further includes identifying, based at least in part on the IP flow information, an IP flow that is being routed through the first interface and that has a data rate in excess of a threshold value. The method further includes selecting a second interface from among a candidate pool of available interfaces that are not experiencing degraded performance. The method further includes determining that the second interface has capacity for the IP flow. The method further includes causing the IP flow to be moved from the first interface to the second interface.

The method may further include preventing the first interface from being added to the candidate pool of available interfaces for a defined time period.

The method may further include obtaining latency information about latency associated with various Internet paths and determining, based at least in part on the latency information, that moving the IP flow to the second interface would not increase the latency of the IP flow.

The first interface and the second interface may both be included within a same edge router.

The first interface may be included within a first edge router that is located in a first geographical location. The second interface may be included within a second edge router that is located in a second geographical location. The second geographical location may be distinct from the first geographical location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
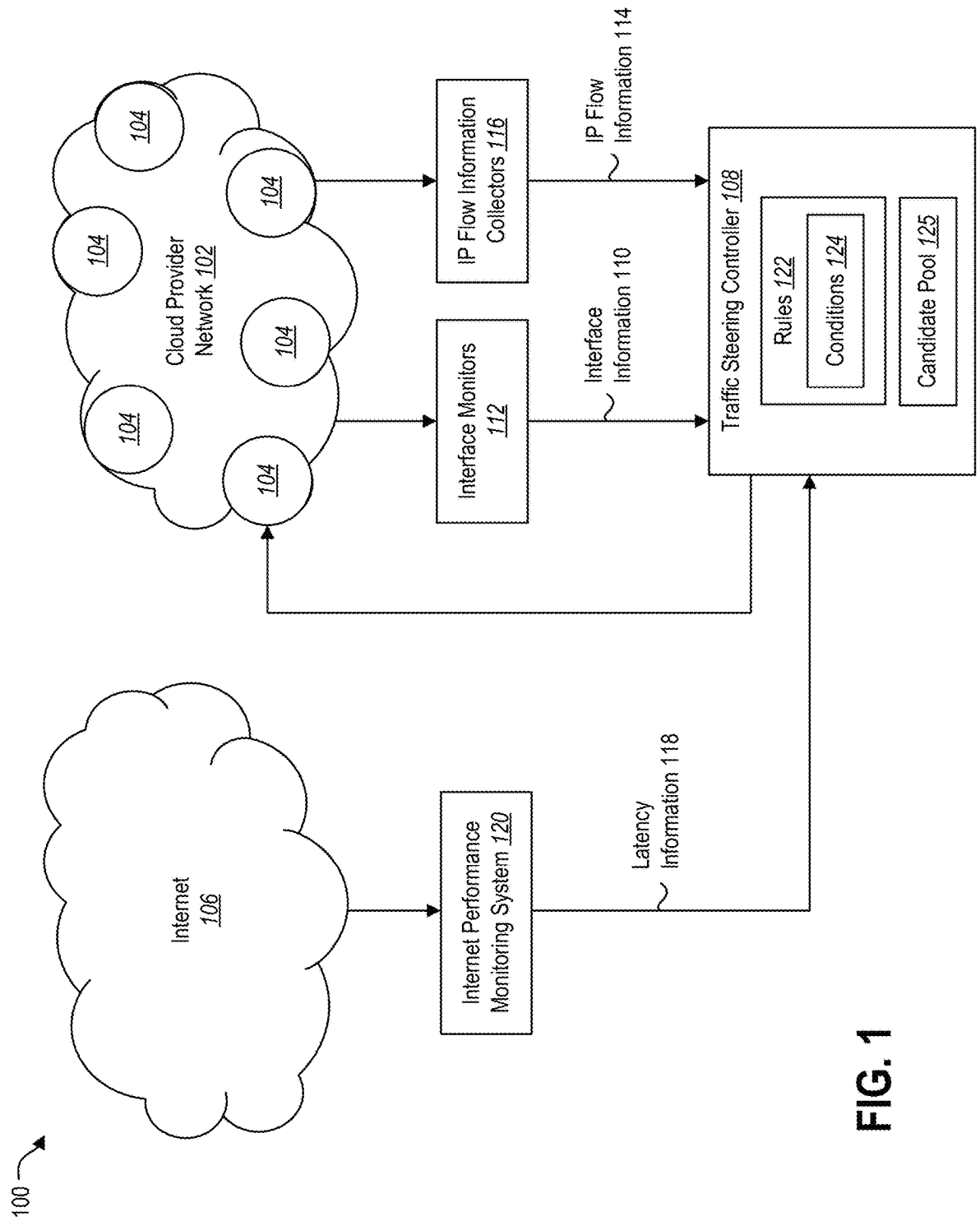
FIG. 1 illustrates an example of a system in which the techniques disclosed herein can be utilized.

The present disclosure is generally related to traffic steering techniques involving the edge routers within a cloud computing provider's network. The techniques disclosed herein are specifically directed to egress traffic, i.e., traffic that is leaving a cloud provider's network and being sent to some destination on the Internet. As noted above, an edge router can include a plurality of interfaces between the cloud provider's network and the Internet. In accordance with the present disclosure, Internet bound traffic that is being routed to a particular interface within an edge router can, under some circumstances, be moved to a different interface (either a different interface within the same edge router or a different interface within a different edge router in the same location or in a different location). Decisions to move Internet bound traffic to a different interface can be based on information about network congestion and/or hardware failures. Thus, the techniques disclosed herein can improve network performance during periods of high network congestion and/or when hardware failures have occurred or are likely to occur.

For example, suppose that a particular IP flow destined to the Internet is being routed through a particular interface within an edge router. Under some circumstances (e.g., if there is significant congestion on that interface), the IP flow originally configured to route through the congested interface can be safely steered to a different interface within the same edge router. Alternatively, the IP flow can be moved to an interface within a different edge router, which can be located in a different geographical location (e.g., a different city). The IP traffic flows that are steered can be selected based on application priority, traffic volume, and other factors.

Moving IP flows to different interfaces can be referred to as "traffic steering." Traffic steering decisions can be based on at least three different types of information: (i) information about interfaces within the various edge routers in a cloud computing provider's network including peering capacity information, (ii) information about IP flows that are being sent through the various interfaces, and (iii) information about the latency associated with particular Internet paths. Some or all of the information that is used in connection with traffic steering decisions can be based on real-time measurements. Some examples illustrating how this information can be collected and used to make traffic steering decisions will be described in greater detail below.

Traffic steering can be performed in response to detecting that an interface is experiencing degraded performance. For example, traffic steering can be performed in response to determining that the number of packet drops experienced by a particular interface exceeds a threshold value. In addition, in some embodiments, traffic steering can be performed proactively. For example, a system log file from an edge router can include information indicating that an interface is likely to experience a hardware failure. In response to processing a log file and detecting such information, a traffic steering controller can proactively move one or more IP flows that are currently being routed through the interface to a different interface.

In general, the term "edge router" can refer to a router that is located at a network boundary, and that enables an internal network to connect to external networks. In some embodiments, an edge router can be located at the boundary between a cloud provider's network and the Internet. An edge router can enable the cloud provider's network to connect to the Internet. For example, an edge router can include a plurality of interfaces between the cloud provider's network and the Internet. The various interfaces can connect to networks operated by different ISPs.

The term "IP flow" can refer to a sequence of IP network packets that share a set of attributes. Some examples of attributes that can be shared by packets within a particular IP flow include source address, destination address, source port, destination port, protocol type, and quality of service (QoS) class.

FIG. 1 illustrates an example of a system 100 in which the techniques disclosed herein can be utilized. The system 100 includes a computer network operated by a cloud computing provider. This type of network may be referred to herein as a cloud provider network 102.

The cloud provider network 102 includes a plurality of Internet POPs. An Internet POP includes an edge router 104. The edge routers 104 are configured to handle egress traffic from the cloud provider network 102 to destinations that are external to the cloud provider network 102, such as destinations on the Internet 106. Each edge router 104 includes a plurality of interfaces between the cloud provider network 102 and the Internet 106. The various interfaces are connected to networks operated by different ISPs. Internet traffic originating within the cloud provider network 102 is routed to an interface within one of the edge routers 104 in the cloud provider network 102. At the interface, the cloud provider hands off the traffic to the ISP associated with the interface. Thus, the cloud provider controls the routing of the Internet traffic up to the edge router 104, but does not control the routing of the Internet traffic beyond the edge router 104.

The edge routers 104 can be configured to implement the Border Gateway Protocol (BGP). As discussed above, the BGP protocol does not take congestion or performance into consideration in connection with routing decisions. This means that degraded performance can occur during periods of heavy Internet traffic or when hardware failures have occurred at certain edge routers 104. To address this problem, the system 100 includes a traffic steering controller 108 that is configured to move Internet traffic to different interfaces to improve performance. Traffic steering can be performed during times of network congestion and/or when hardware failures have occurred or are likely to occur within the cloud provider network 102.

Traffic steering decisions can be based at least in part on information about interfaces within the edge routers 104. Such information may be referred to herein as interface information 110. The system 100 shown in FIG. 1 includes interface monitors 112 that are configured to monitor the interfaces within the edge routers 104. The interface monitors 112 collect the interface information 110 and provide it to the traffic steering controller 108.

The interface information 110 can include telemetry about the interfaces within the various edge routers 104. For example, the interface information 110 can include information about packet drops that have been experienced at the various interfaces within the edge routers 104. The interface telemetry can be based on real-time measurements. In some embodiments, the interface monitors 112 can include Simple Network Management Protocol (SNMP) counters. In some embodiments, the interface monitors 112 can include components within the edge routers 104 that generate link state packets (LSPs). The interface information 110 can also include information about interface capacity (i.e., the amount of traffic that can be sent and/or received through various interfaces), information about interface utilization (i.e., the amount of traffic that is currently being sent and/or received through various interfaces), network state, quality of service (QoS) health, and the like.

The interface information 110 can also include information related to potential hardware failures. In some embodiments, this information can be obtained by processing log files that are maintained by the edge routers 104. The interface monitors 112 can be configured to process the log files and provide information related to potential hardware failures to the traffic steering controller 108.

Traffic steering decisions can also be based at least in part on information about IP flows that are being sent through the edge routers 104. Such information may be referred to herein as IP flow information 114. The system 100 shown in FIG. 1 includes IP flow information collectors 116 that are configured to monitor the edge routers 104, collect IP flow information 114, and provide the IP flow information 114 to the traffic steering controller 108. In some embodiments, the information that is collected for a particular IP flow can include the data rate of the IP flow, a priority level of the IP flow, and an interface through which the IP flow is currently being routed. IP flows can be aggregated and categorized into different buckets such as small flows versus large ("elephant") flows.

Traffic steering decisions can also be based at least in part on information about the latency associated with various Internet paths. Such information may be referred to herein as latency information 118. The system 100 shown in FIG. 1 includes an Internet performance monitoring system 120 that is configured to determine latency information 118 associated with various Internet paths and to provide such latency information 118 to the traffic steering controller 108.

The traffic steering controller 108 is configured to perform traffic steering to improve network performance. For example, the traffic steering controller 108 can be configured to cause IP flows to be moved to different interfaces. In some embodiments, the traffic steering controller 108 can be configured to determine routes that would mitigate congestion and/or hardware failures in connection with egress traffic, and to inject those routes into edge routers 104 within the cloud provider network 102.

Various rules 122 can be defined that determine when the traffic steering controller 108 causes an IP flow to be moved to a different interface. At least some of the rules 122 can be defined in terms of one or more conditions 124. For example, the traffic steering controller 108 can be configured with a rule 122 indicating that the traffic steering controller 108 should move a particular IP flow to a different interface when the data rate of the IP flow exceeds a threshold value. Some additional examples of possible rules 122 and conditions 124 that affect traffic steering will be described below.

The traffic steering controller 108 can be configured to maintain a candidate pool 125 of available interfaces. When the traffic steering controller 108 determines that an IP flow should be moved to a different interface, the new interface can be selected from the candidate pool 125 of available interfaces. In some embodiments, the candidate pool 125 of available interfaces can include interfaces that have not experienced degraded performance during a recent time period.

Figure 2:
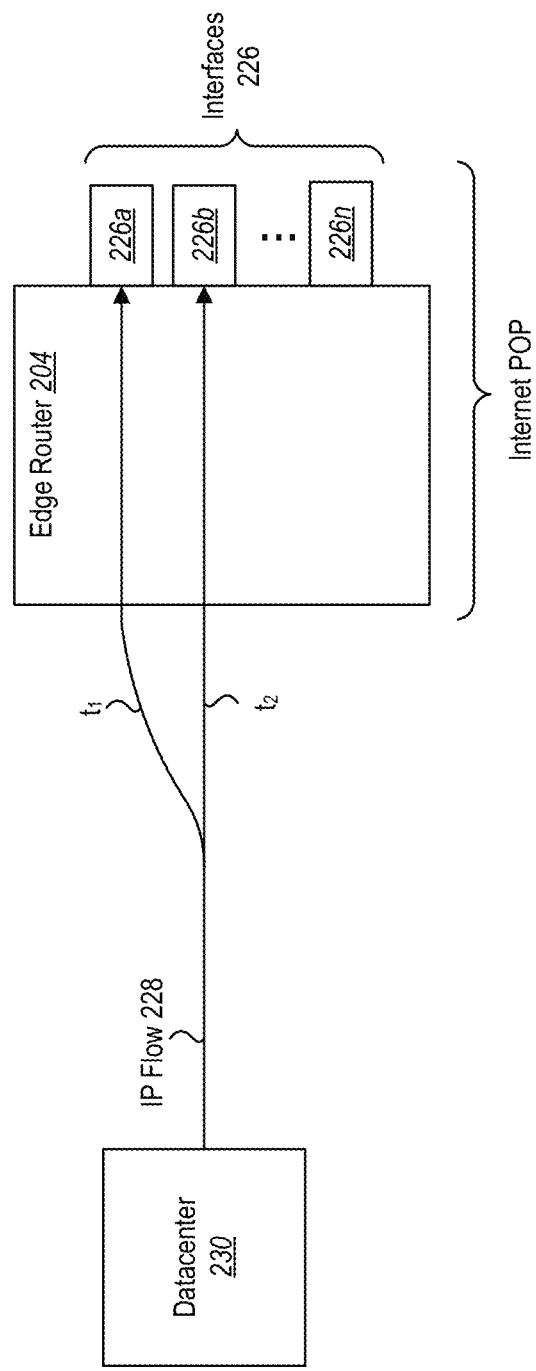
FIG. 2 illustrates an example of traffic steering that can be performed in accordance with the present disclosure, in which an IP flow is moved from one interface to another interface within the same edge router.

FIG. 2 illustrates an Internet POP that can be included in a cloud provider network. The Internet POP includes an edge router 204. The edge router 204 includes a plurality of interfaces 226 between the cloud provider network and the Internet. The various interfaces 226 can connect to networks operated by different ISPs. For example, FIG. 2 shows the edge router 204 with a first interface 226a, a second interface 226b, and an Nth interface 226n. The first interface 226a can be connected to a first network operated by a first ISP, the second interface 226b can be connected to a second network operated by a second ISP, and the Nth interface 226n can be connected to an Nth network operated by an Nth ISP.

FIG. 2 also illustrates an example of traffic steering that can occur in accordance with the present disclosure. In the depicted example, an IP flow 228 is sent from a datacenter 230 to some destination on the Internet. Within the cloud provider network, the IP flow 228 is routed from the datacenter 230 to an interface 226 within the edge router 204. FIG. 2 shows the IP flow 228 being routed from the datacenter 230 to the first interface 226a of the edge router 204 at a first point in time ($t_1$). Under some circumstances, the IP flow 228 can be moved to another interface 226 on the edge router 204. For example, the IP flow 228 can be moved to another interface 226 if the IP flow 228 has a high data rate and the first interface 226a is experiencing degraded performance (e.g., there is significant congestion on the first interface 226a).

FIG. 2 shows the IP flow 228 being routed from the datacenter 230 to the second interface 226b of the edge router 204 at a second point in time ($t_2$). The second interface 226b can be selected from a candidate pool 125 of available interfaces that have not experienced degraded performance during a recent time period. In addition, the first interface 226a can be removed from the candidate pool 125 of available interfaces because the first interface 226a is experiencing degraded performance. The first interface 226a can remain excluded from the candidate pool 125 of available interfaces until the first interface 226a is no longer experiencing degraded performance (e.g., until the number of packet drops over a defined time interval is less than a defined threshold value). In some embodiments, the first interface 226a can remain excluded from the candidate pool 125 of available interfaces until the first interface 226a has not experienced degraded performance for a defined time period.

Figure 3:
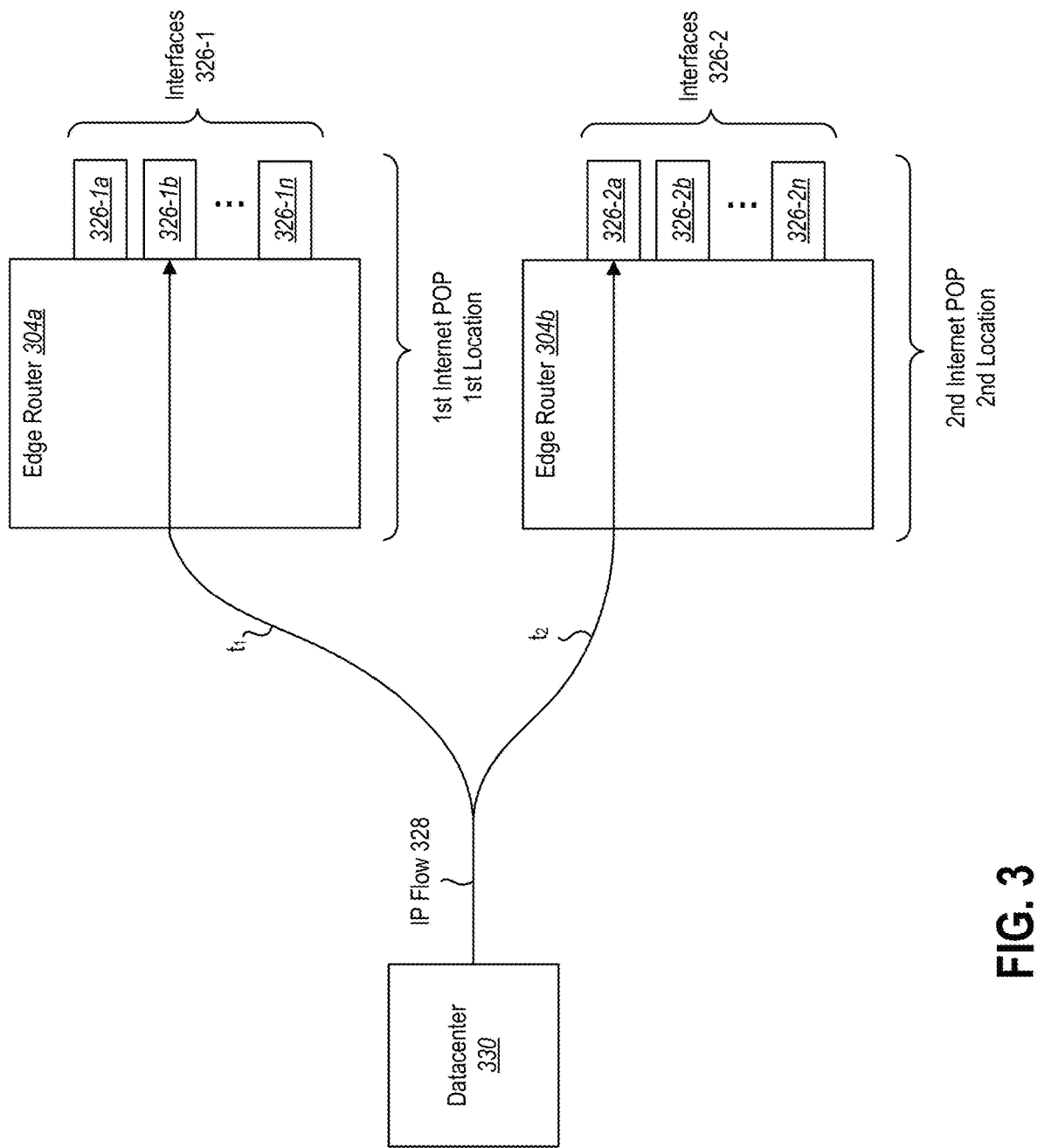
FIG. 3 illustrates another example of traffic steering that can be performed in accordance with the present disclosure, in which an IP flow is moved from an interface within a first edge router to another interface within a second edge router.

FIG. 3 illustrates another example of traffic steering that can occur in accordance with the present disclosure. In the example shown in FIG. 3, an IP flow 328 is moved from a first Internet POP in a first geographic location to a second Internet POP in a second geographic location. More specifically, the IP flow 328 is moved from an interface 326-1 within a first edge router 304a to another interface 326-2 within a second edge router 304b. In some embodiments, the edge routers 304a-b can be located in different geographic locations (e.g., different cities).

The first edge router 304a includes a plurality of interfaces 326-1 between the cloud provider network and the Internet. FIG. 3 shows the first edge router 304a with a first interface 326-1a, a second interface 326-1b, and an Nth interface 326-1n. Similarly, the second edge router 304b includes a plurality of interfaces 326-2 between the cloud provider network and the Internet. FIG. 3 shows the second edge router 304b with a first interface 326-2a, a second interface 326-2b, and an Nth interface 326-2n. The various interfaces 326-1, 326-2 can connect to different networks operated by different ISPs.

As in the previous example, an IP flow 328 is being sent from a datacenter 330 to some destination on the Internet. FIG. 3 shows the IP flow 328 being routed from the datacenter 330 to the second interface 326-1b of the first edge router 304a at a first point in time ($t_1$). Under some circumstances, the IP flow 328 can be moved to an interface 326-2 on the second edge router 304b if it is determined that doing so will be likely to improve network performance. For example, the IP flow 328 can be moved away from the second interface 326-1b of the first edge router 304a if it is determined that the second interface 326-1b of the first edge router 304a is experiencing degraded performance. FIG. 3 shows the IP flow 328 being routed from the datacenter 330 to the first interface 326-2a of the second edge router 304b at a second point in time ($t_2$).

As in the previous example, the first interface 326-2a of the second edge router 304b can be selected from a candidate pool 125 of available interfaces. In addition, the second interface 326-1b can be excluded from the candidate pool 125 of available interfaces because the second interface 326-1b is experiencing degraded performance.

Figure 4:
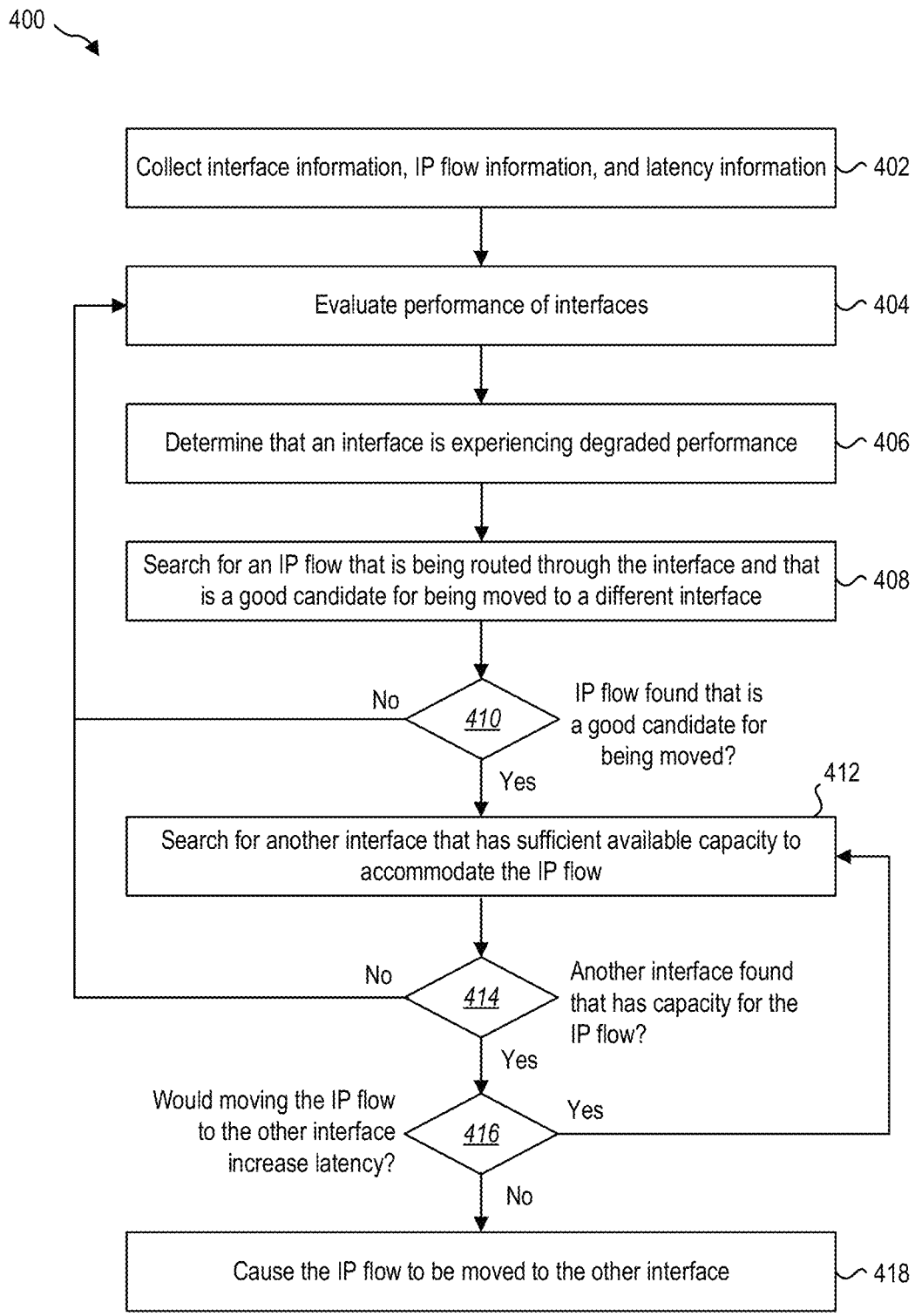
FIG. 4 illustrates an example of a method that can be implemented in order to determine whether an IP flow that is being routed to a particular interface in an edge router should be moved to a different interface.

FIG. 4 illustrates an example of a method 400 that can be implemented in order to determine whether an IP flow that is being routed to a particular interface in an edge router should be moved to a different interface. The method 400 will be described in relation to the system 100 shown in FIG. 1. The method 400 can be implemented by the traffic steering controller 108 in the system 100 shown in FIG. 1.

The method includes collecting 402 interface information 110, IP flow information 114, and latency information 118. As discussed above, the interface information 110 can be collected from one or more interface monitors 112, and the interface information 110 can include information about interfaces within the edge routers 104 (such as the interfaces 226 in the edge router 204 shown in FIG. 2 and the interfaces 326-1, 326-2 in the edge routers 304a-b shown in FIG. 3). The IP flow information 114 can be collected from one or more IP flow information collectors 116, and the IP flow information 114 can include information about IP flows that are being sent through the edge routers 104. The latency information 118 can be collected from the Internet performance monitoring system 120, and the latency information 118 can include information about the latency associated with various Internet paths.

The method 400 also includes evaluating 404 the performance of the interfaces to see whether any of the interfaces are experiencing degraded performance. Various rules 122 and conditions 124 can be defined for determining when an interface is experiencing degraded performance.

As indicated above, the interface information 110 can include telemetry about the interfaces within the various edge routers 104, such as information about packet drops. In some embodiments, evaluating the performance of a particular interface can include comparing the number of packet drops experienced by the interface within a particular time interval to a threshold value. If the number of packet drops experienced by the interface within the time interval exceeds the threshold value, then this can be interpreted as an indication that the interface is experiencing degraded performance.

The interface information 110 can also include information related to potential hardware failures. This information can be obtained from log files that are maintained by the edge routers 104. In some embodiments, evaluating the performance of a particular interface can include processing the log file(s) associated with that interface to determine whether there is anything in the log file(s) indicating that a hardware failure has occurred or is likely to occur in the near future. If a log file includes information suggesting that a hardware failure has occurred or is likely to occur in the near future, then this can be interpreted as an indication that the interface is experiencing degraded performance.

At some point, the traffic steering controller 108 can determine 406 that an interface is experiencing degraded performance. The traffic steering controller 108 can be configured with various rules 122 for determining when an interface is experiencing degraded performance.

One or more rules 122 can define degraded performance in terms of network congestion. For example, the traffic steering controller 108 can be configured with a rule 122 indicating that an interface is experiencing degraded performance if the number of packet drops experienced by the interface within a defined time interval exceeds a threshold value.

One or more rules 122 can define degraded performance in terms of hardware failures. For example, the traffic steering controller 108 can be configured with a rule 122 indicating that an interface is experiencing degraded performance if the log file(s) associated with the interface indicate that the interface has experienced a hardware failure or is likely to experience a hardware failure in the near future.

In response to determining 406 that an interface is experiencing degraded performance, the traffic steering controller 108 can search 408 for an IP flow that is being routed through the interface and that is a good candidate for being moved to a different interface. Various rules 122 and conditions 124 can be defined for determining when an IP flow is a good candidate for being moved to a different interface.

In some embodiments, the traffic steering controller 108 can be configured with a rule 122 indicating that an IP flow is a good candidate for being moved to a different interface if at least one condition 124 is satisfied. The condition 124 can be that the data rate of the IP flow exceeds a threshold value. This condition 124 limits the use of traffic steering to large IP flows, i.e., IP flows that are likely to have a noticeable effect on network performance and therefore that are likely to alleviate network congestion if they are moved.

In some embodiments, the traffic steering controller 108 can be configured with a rule 122 indicating that an IP flow is a good candidate for being moved to a different interface if at least two conditions 124 are satisfied. The first condition 124 can be that the data rate of the IP flow exceeds a threshold value (as just described). The second condition 124 can be that the priority level of the IP flow exceeds a threshold priority level.

A plurality of priority levels can be defined for an IP flow. In some embodiments, at least four priority levels can be defined: a control plane level, an interactive level, a best effort level, and a scavenger level. The control plane level can be the highest priority level, and it can be assigned to IP flows that are related to control and management of the cloud provider network 102. The interactive priority level can be the next highest priority level, and it can be assigned to IP flows corresponding to online activity that involves a plurality of people interacting with one another in real time (e.g., online meetings). The best effort priority level can be the next highest priority level, and it can be assigned to IP flows that do not qualify for the interactive priority level but that are still considered important (e.g., streaming media). The scavenger priority level can be the lowest priority level, and it can be assigned to IP flows that do not qualify for a higher priority level.

In some embodiments where these priority levels (control plane, interactive, best effort, and scavenger) have been defined, one condition 124 for determining when an IP flow is a good candidate for being moved to a different interface can be that the priority level of the IP flow should be at the best effort priority level (or higher).

If the traffic steering controller 108 is unable to find an IP flow that is being routed through the interface experiencing degraded performance and that is a good candidate for being moved to a different interface, then the method 400 can return to evaluating 404 the performance of the interfaces without moving any IP flows from the interface that is experiencing degraded performance.

If, however, the traffic steering controller 108 finds 410 an IP flow that is being routed through the interface experiencing degraded performance and that is a good candidate for being moved to a different interface, then the traffic steering controller 108 can search for another interface that has sufficient available capacity to accommodate the IP flow. In some embodiments, the traffic steering controller 108 can search 412 within a candidate pool 125 of available interfaces for an interface that has sufficient available capacity to accommodate the IP flow. For example, the traffic steering controller 108 can search 412 within a candidate pool 125 of available interfaces for an interface where the difference between the total capacity of the interface (i.e., the total amount of traffic that can be sent and/or received through the interface) and the current utilization of the interface (i.e., the amount of traffic that is currently being sent and/or received through the interface) is large enough that the IP flow can be moved to the interface without causing that interface to experience degraded performance.

For example, suppose that the total capacity of an interface is x Gbps, and the current utilization of the interface is y Gbps. In this case, the available capacity of the interface can be represented as x−y Gbps. If the data rate of an IP flow exceeds x−y Gbps, then the interface does not have sufficient available capacity to accommodate the IP flow. If, however, the data rate of an IP flow does not exceed x−y Gbps, then the interface may have sufficient available capacity to accommodate the IP flow.

Various rules 122 and conditions 124 can be defined for determining when an interface has sufficient available capacity to accommodate an IP flow that is being moved from another interface. In some embodiments, the traffic steering controller 108 can be configured with a rule 122 indicating that an interface whose available capacity is x−y Gbps can accommodate another IP flow if the data rate of the IP flow is less than x−y Gbps (or less than or equal to x−y Gbps). Alternatively, the traffic steering controller 108 can be configured with a rule 122 indicating that an interface whose available capacity is x−y Gbps can accommodate another IP flow if the data rate of the IP flow is less than x−y−z Gbps, where z represents a buffer.

As indicated above, the interface information 110 that the traffic steering controller 108 receives from the interface monitors 112 can include information about the total capacity of the interface and the current utilization of the interface. Thus, the traffic steering controller 108 can utilize the interface information 110 received from the interface monitors 112 to determine whether a particular interface has sufficient available capacity to accommodate the IP flow.

If the traffic steering controller 108 is unable to find an interface that has sufficient available capacity to accommodate the IP flow, then the method 400 can return to evaluating 404 the performance of the interfaces without moving any IP flows from the interface that is experiencing degraded performance.

If, however, the traffic steering controller 108 finds 414 an interface that has sufficient available capacity to accommodate the IP flow, then the traffic steering controller 108 can determine 416 whether moving the IP flow to the interface would be likely to increase the latency of the IP flow. In order to make this determination, the traffic steering controller 108 can utilize latency information 118 provided by the Internet performance monitoring system 120. As indicated above, the Internet performance monitoring system 120 can be configured to determine latency information 118 associated with various Internet paths and to provide such latency information 118 to the traffic steering controller 108.

If the traffic steering controller 108 determines 416 that moving the IP flow to the interface would be likely to increase the latency of the IP flow, then the method 400 can return to searching for another interface that has sufficient available capacity to accommodate the IP flow. If the traffic steering controller 108 has considered all possible interfaces within the cloud provider network 102 and has still not found an interface that has sufficient available capacity to accommodate the IP flow and would not be likely to increase the latency of the IP flow, then the method 400 can return to evaluating 404 the performance of the interfaces without moving any IP flows from the interface that is experiencing degraded performance.

If the traffic steering controller 108 determines 416 that moving the IP flow to the interface would not be likely to increase the latency of the IP flow, then the traffic steering controller 108 can cause 418 the IP flow to be moved to the interface. In some embodiments, causing 418 the IP flow to be moved to the interface can include injecting routes into one or more edge routers 104 within the cloud provider network 102.

Figure 5:
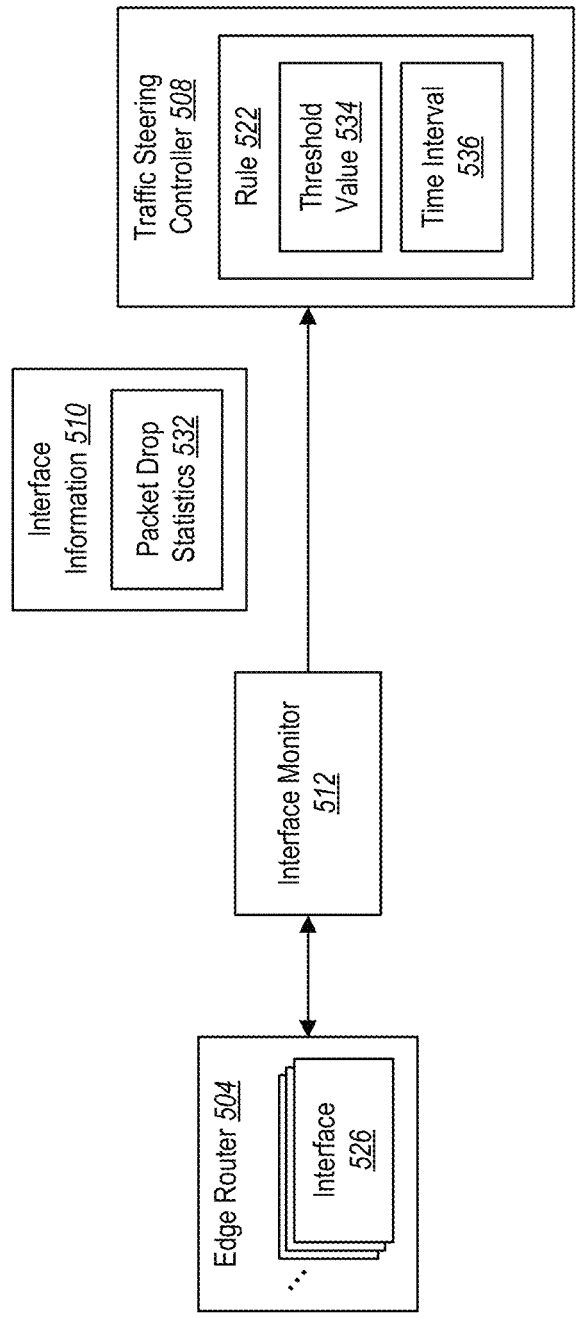
FIG. 5 illustrates an example showing how a traffic steering controller can determine that an interface in an edge router is experiencing degraded performance based at least in part on the number of packet drops that have been experienced by the interface.

FIG. 5 illustrates an example showing one way that a traffic steering controller 508 can determine that an interface 526 in an edge router 504 is experiencing degraded performance. In the depicted example, the traffic steering controller 508 determines that an interface 526 of an edge router 504 is experiencing degraded performance based at least in part on the number of packet drops that have been experienced by the interface 526 during a defined time interval 536.

The edge router 504 shown in FIG. 5 includes a plurality of interfaces 526. An interface monitor 512 is configured to monitor the interfaces 526 within the edge routers 504. The interface monitor 512 determines information about the interfaces 526 and provides this interface information 510 to the traffic steering controller 508. In the depicted example, the interface information 510 includes packet drop statistics 532. The packet drop statistics 532 indicate how many packet drops have been experienced by the various interfaces 526 in the edge router 504.

The traffic steering controller 508 can be configured with various rules for determining when an interface 526 is experiencing degraded performance. FIG. 5 shows the traffic steering controller 508 with a rule 522 that defines degraded performance for an interface 526 in terms of the number of packet drops that have been experienced by the interface 526 within a defined time interval 536. The rule 522 specifies a threshold value 534. In some embodiments, the rule 522 can indicate that a particular interface 526 has experienced degraded performance if the number of packet drops experienced by the interface 526 within the defined time interval 536 exceeds the threshold value 534.

In accordance with this rule 522, the traffic steering controller 508 can evaluate the performance of the interfaces 526 in the edge router 504 by comparing the number of packet drops experienced by the various interfaces 526 (as indicated by the packet drop statistics 532) to the threshold value 534. In response to determining that the number of packet drops experienced by a particular interface 526 within the defined time interval 536 exceeds the threshold value 534, the traffic steering controller 508 can infer that the interface 526 is experiencing degraded performance. The traffic steering controller 508 can then proceed to determine whether it might be beneficial to move one or more IP flows that are currently being routed to the interface 526 to a different interface 526.

Figure 6:
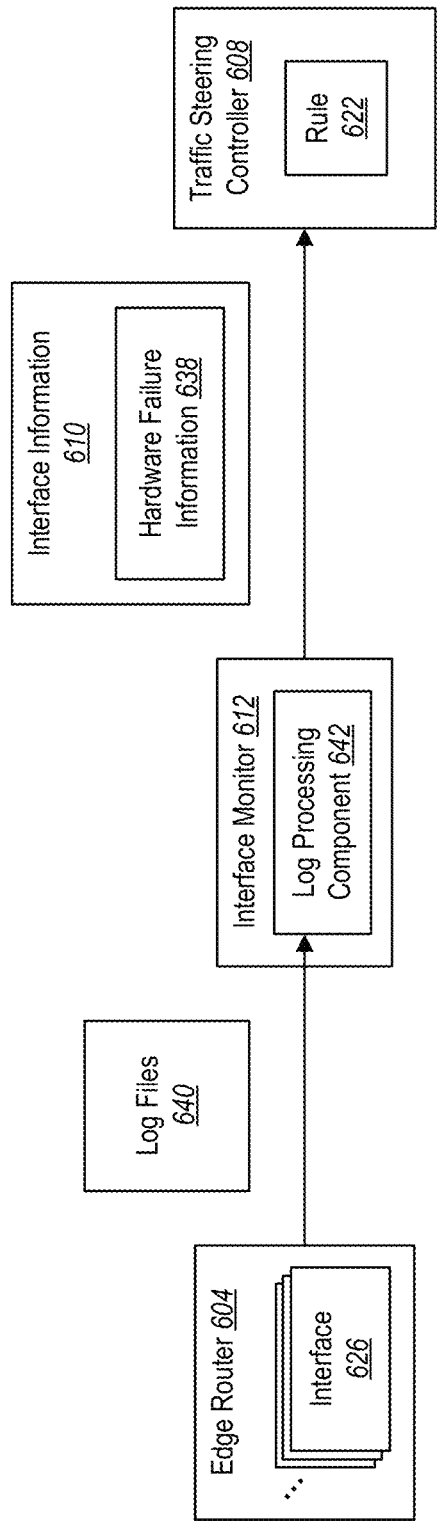
FIG. 6 illustrates another example showing how a traffic steering controller can determine that an interface in an edge router is experiencing degraded performance based at least in part on information that is received about hardware failures that have occurred or are likely to occur.

FIG. 6 illustrates an example showing another way that a traffic steering controller 608 can determine that an interface 626 in an edge router 604 is experiencing degraded performance. In the depicted example, the traffic steering controller 608 determines that an interface 626 in an edge router 604 is experiencing degraded performance based at least in part on information that is received about hardware failures that have occurred or are likely to occur.

FIG. 6 shows an edge router 604 that includes a plurality of interfaces 626. An interface monitor 612 is configured to monitor the interfaces 626 within the edge routers 604. The interface monitor 612 determines information about the interfaces 626 and provides this interface information 610 to the traffic steering controller 608.

In the depicted example, the interface information 610 includes information about hardware failures associated with the interfaces 626. This information may be referred to herein as hardware failure information 638. The hardware failure information 638 can include information about hardware failures that have already occurred in connection with the interfaces 626 of the edge router 604. For example, the hardware failure information 638 can identify hardware components associated with the interfaces 626 that have already failed. The hardware failure information 638 can also include information about potential hardware failures that may occur in the future. For example, the hardware failure information 638 can identify certain states or events indicating that one or more interfaces 626 in the edge router 604 are likely to fail in the near future.

Hardware failure information 638 associated with the interfaces 626 of a particular edge router 604 can be obtained by processing one or more log files 640 that are maintained by the edge router 604. In FIG. 6, the interface monitor 612 is shown with a log processing component 642 that is configured to process the log files 640 in order to determine the hardware failure information 638. When the interface monitor 612 determines (based at least in part on processing the log files 640) that some type of hardware failure has occurred or is likely to occur in connection with a particular interface 626, the interface monitor 612 can provide the traffic steering controller 608 with hardware failure information 638 describing the hardware failure.

The traffic steering controller 608 can be configured to enforce one or more rules for determining when an interface 626 is experiencing degraded performance. FIG. 6 shows the traffic steering controller 608 with a rule 622 that defines degraded performance for an interface 626 in terms of the receipt of hardware failure information 638 from the interface monitor 612. In some embodiments, the rule 622 can indicate that a particular interface 626 has experienced degraded performance if hardware failure information 638 associated with the interface 626 has been received. In response to receiving hardware failure information 638 in connection with a particular interface 626, the traffic steering controller 608 can (based on the rule 622) infer that the interface 626 is experiencing degraded performance. The traffic steering controller 608 can then proceed to determine whether it might be beneficial to move one or more IP flows that are currently being routed to the interface 626. In making this determination, the traffic steering controller 608 can follow the process that is outlined in the method 400 shown in FIG. 4.

Figure 7:
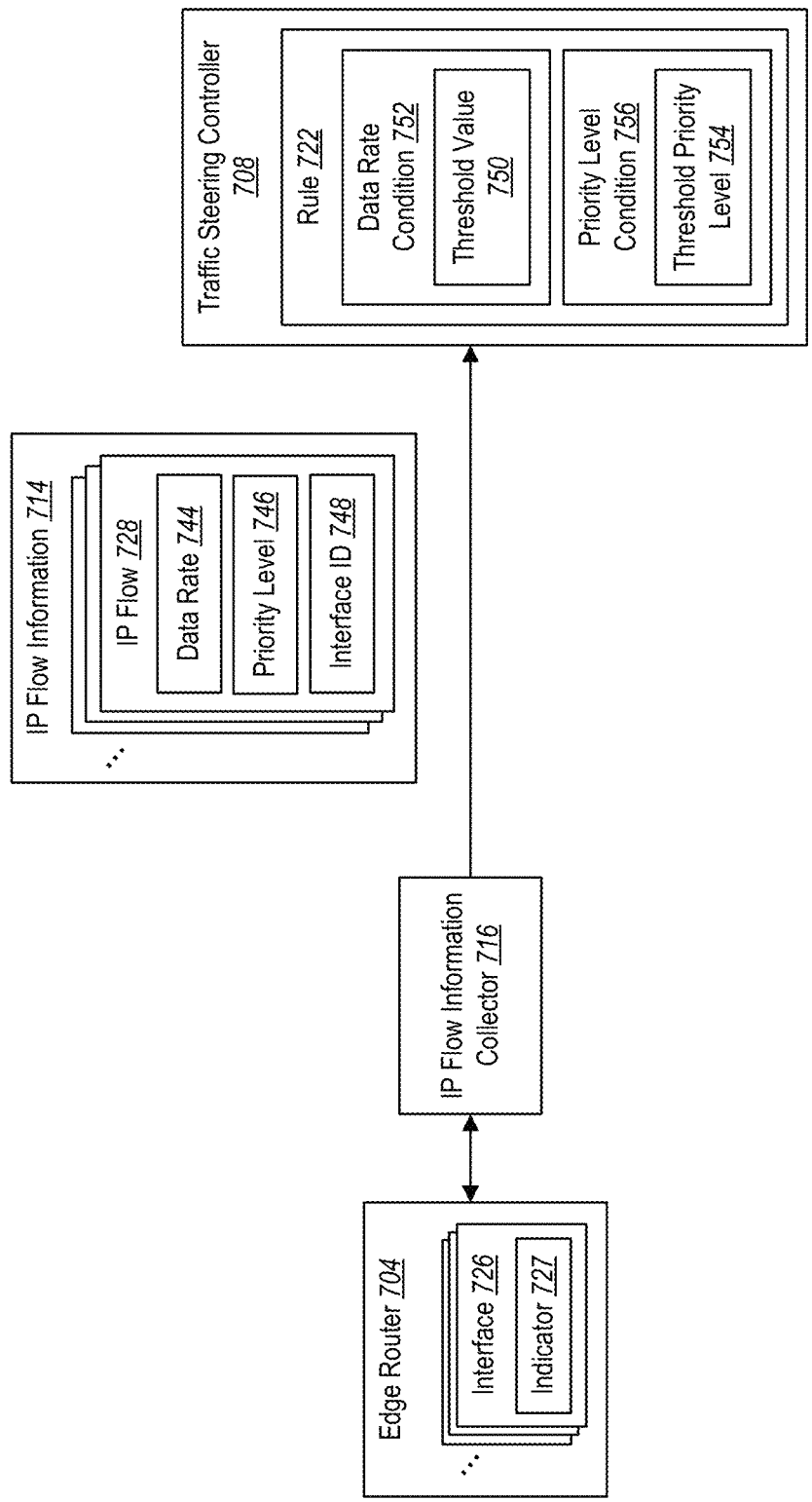
FIG. 7 illustrates an example showing one way that a traffic steering controller can identify an IP flow that is a good candidate for being moved to a different interface.

Reference is now made to FIG. 7. As indicated above, once a traffic steering controller 708 determines that an interface 726 is experiencing degraded performance, the traffic steering controller 708 can search for an IP flow 728 that is being routed through the interface 726 and that is a good candidate for being moved to a different interface 726. FIG. 7 illustrates an example showing one way that a traffic steering controller 708 can identify an IP flow 728 that is a good candidate for being moved to a different interface 726.

FIG. 7 shows an edge router 704 that includes a plurality of interfaces 726. Each interface 726 is associated with an indicator 727. The indicator 727 associated with a particular interface 726 indicates whether that interface 726 is part of a candidate pool 125 of available interfaces. In some embodiments, when a determination is made that an interface 726 is experiencing degraded performance, the indicator 727 associated with that interface 726 can be changed to indicate that the interface 726 is no longer part of the candidate pool 125 of available interfaces. When the performance of the interface 726 improves to a sufficient extent that the interface 726 is no longer experiencing degraded performance, the indicator 727 associated with that interface 726 can be changed to indicate that the interface 726 is once again part of the candidate pool 125 of available interfaces. In some embodiments, an interface 726 can be excluded from the candidate pool 125 of available interfaces until the interface 726 has not experienced degraded performance for a defined time period.

An IP flow information collector 716 is configured to monitor the edge router 704 and determine information about IP flows 728 that are being sent through the interfaces 726 of the edge router 704. The information that is determined for a particular IP flow 728 can include the data rate 744 of the IP flow 728 and the priority level 746 of the IP flow 728. The information for a particular IP flow 728 can also include an identifier (ID) associated with the interface 726 through which the IP flow 728 is currently being routed. Such an ID may be referred to as an interface ID 748. The IP flow information collector 716 is also configured to provide the IP flow information 714 to the traffic steering controller 708.

The traffic steering controller 708 can be configured to enforce various rules and conditions for determining when an IP flow 728 is a good candidate for being moved to a different interface 726. In some embodiments, the traffic steering controller 708 can be configured to enforce a rule 722 indicating that an IP flow 728 is a good candidate for being moved to a different interface 726 if at least one condition is satisfied. The condition can be that the data rate 744 of the IP flow 728 exceeds a threshold value 750 for the data rate 744. This condition may be referred to as a data rate condition 752.

Alternatively, in some embodiments, the rule 722 can indicate that an IP flow 728 is a good candidate for being moved to a different interface 726 if at least two conditions are satisfied. The first condition can be the data rate condition 752. The second condition can be that the priority level 746 of the IP flow 728 exceeds a threshold priority level 754. This condition may be referred to as a priority level condition 756.

In response to determining that an interface 726 is experiencing degraded performance, the traffic steering controller 708 can search for an IP flow 728 that is being routed through the interface 726 and that satisfies the condition(s) that are specified by the rule 722. For example, if the rule 722 includes the data rate condition 752, the traffic steering controller 708 can search for an IP flow 728 that is being routed through the interface 726 that is experiencing degraded performance and that has a data rate 744 that satisfies the data rate condition 752 (e.g., a data rate 744 that is greater than or equal to the threshold value 750). If the rule 722 also includes the priority level condition 756, the traffic steering controller 708 can search for an IP flow 728 that is being routed through the interface 726 that is experiencing degraded performance, that has a data rate 744 that satisfies the data rate condition 752, and that has a priority level 746 that satisfies the priority level condition 756 (e.g., a priority level 746 that is greater than or equal to the threshold priority level 754). If the traffic steering controller 708 is able to identify an IP flow 728 that satisfies the specified condition(s), the traffic steering controller 708 can then search for another interface 726 that is part of the candidate pool 125 of available interfaces and that has sufficient available capacity to accommodate the IP flow 728.

Figure 8:
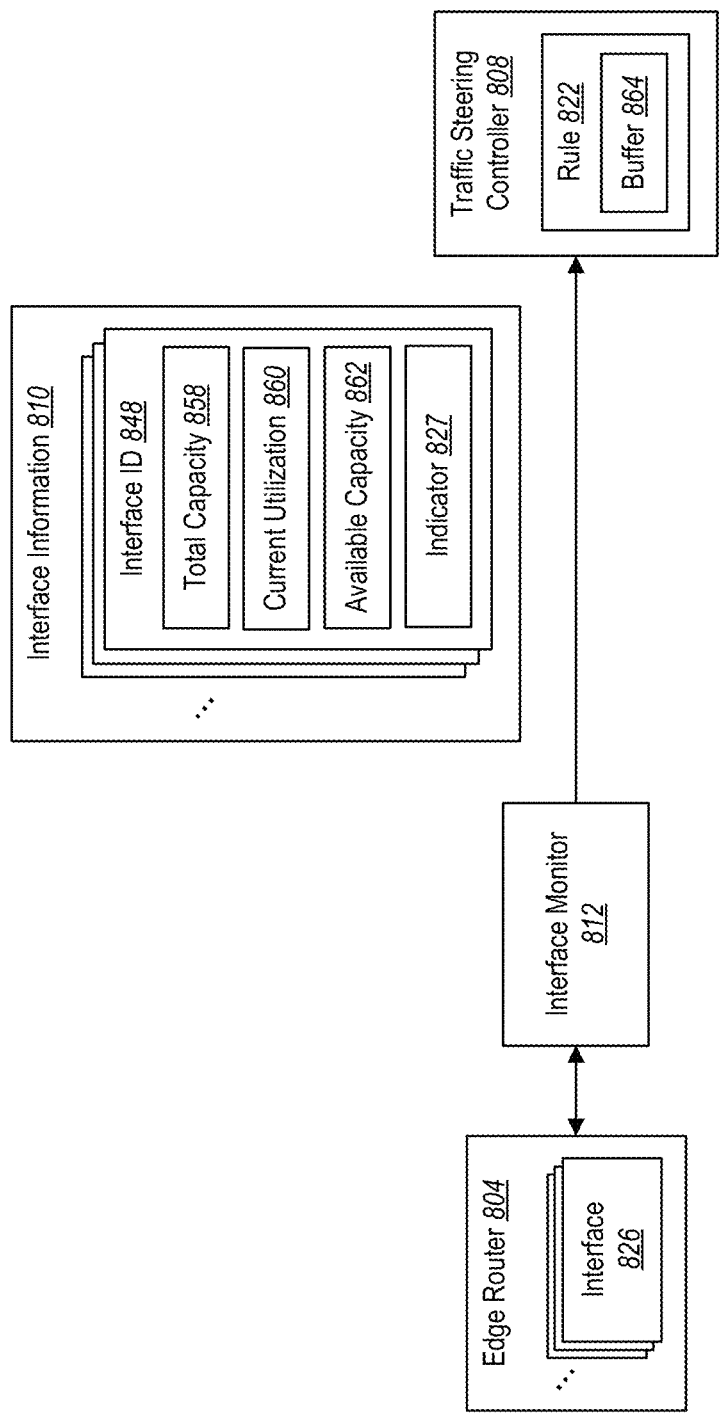
FIG. 8 illustrates an example showing how a traffic steering controller can determine whether an interface has sufficient available capacity to accommodate an IP flow.

FIG. 8 illustrates an example showing how a traffic steering controller 808 can determine whether an interface 826 has sufficient available capacity to accommodate an IP flow.

Similar to the examples discussed previously, FIG. 8 shows an edge router 804 that includes a plurality of interfaces 826. An interface monitor 812 is configured to monitor the interfaces 826 within the edge routers 804. The interface monitor 812 determines information about the interfaces 826 and provides this interface information 810 to the traffic steering controller 808.

In the depicted example, the interface information 810 includes information about the total capacity 858, the current utilization 860, and the available capacity 862 of various interfaces 826. In some embodiments, the available capacity 862 for a particular interface 826 can be defined as the difference between the total capacity 858 of the interface 826 and the current utilization 860 of the interface 826. The information about a particular interface 826 can also include an indicator 827 about whether that interface 826 belongs to a candidate pool 125 of available interfaces. The information about a particular interface 826 can also include an interface ID 848.

If the traffic steering controller 808 determines that an interface 826 is experiencing degraded performance and also finds an IP flow that is being routed through the interface 826 and is a good candidate for being moved to a different interface 826, then the traffic steering controller 808 can search for another interface 826 that belongs to the candidate pool 125 of available interfaces (e.g., based on the indicator 827) and that has sufficient available capacity 862 to accommodate the IP flow.

The traffic steering controller 808 can be configured to enforce a rule 822 that indicates when an interface 826 has sufficient available capacity 862 to accommodate an IP flow that is being moved from another interface 826. In some embodiments, the rule 822 can indicate that an interface 826 can accommodate another IP flow if the data rate of the IP flow is less than the available capacity 862 of the interface 826. Alternatively, the rule 822 can indicate that an interface 826 can accommodate another IP flow if the data rate of the IP flow is less than the available capacity 862 of the interface 826. Alternatively, the rule 822 can indicate that an interface 826 can accommodate another IP flow if the data rate of the IP flow is less than the available capacity 862 of the interface 826 by more than a defined buffer 864.

In some embodiments, if the traffic steering controller 808 is able to identify an interface 826 that belongs to the candidate pool 125 of available interfaces and that has sufficient available capacity 862 to accommodate the IP flow that is being moved, the traffic steering controller 808 can determine whether moving the IP flow to the interface 826 would increase the latency of the IP flow, as discussed above.

Figure 9:
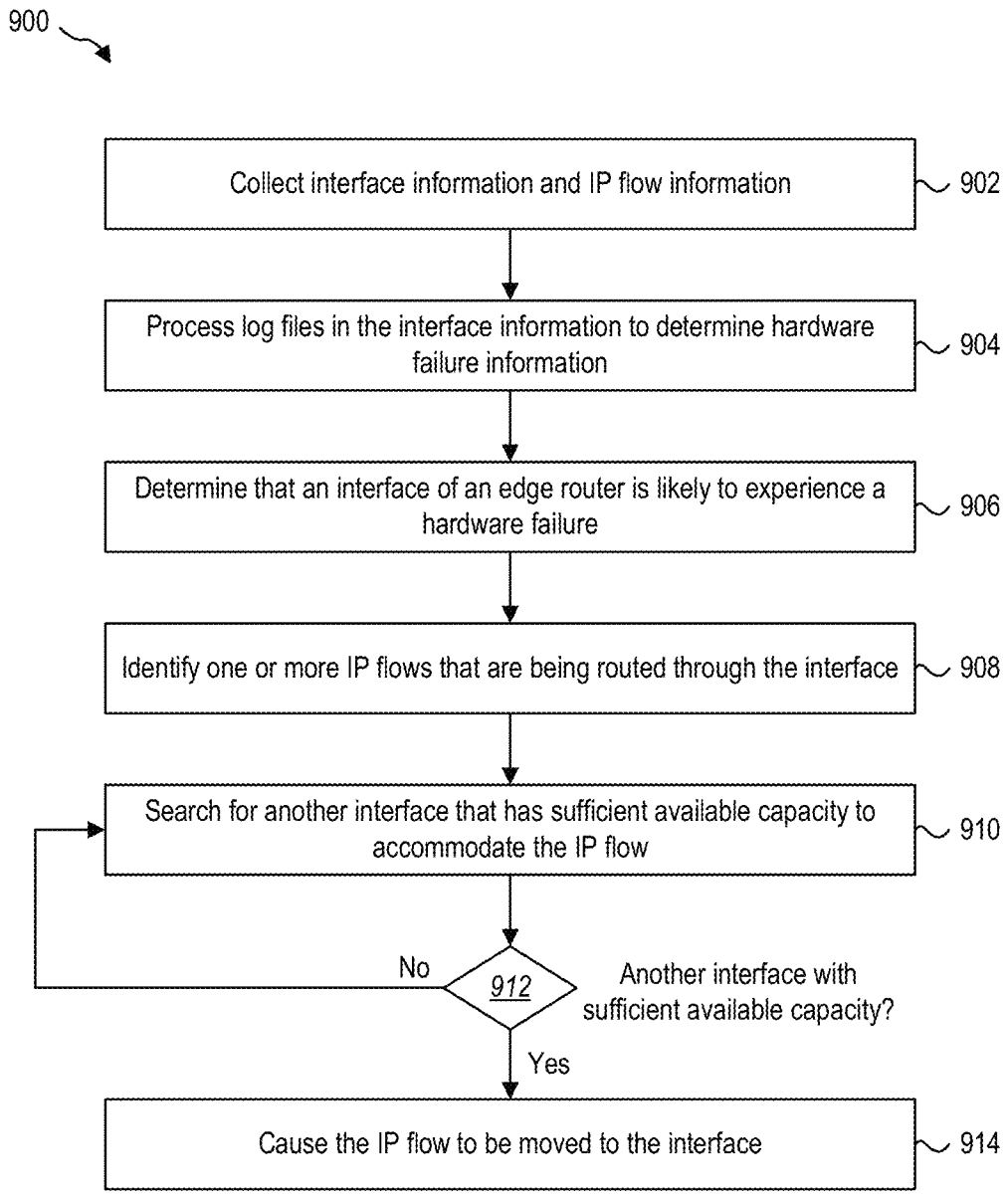
FIG. 9 illustrates an example of a method in which traffic steering can be performed proactively.

FIG. 9 illustrates an example of a method 900 in which traffic steering can be performed proactively. The method 900 will be described in relation to the system 100 shown in FIG. 1. The method 900 can be implemented by the traffic steering controller 108 in the system 100 shown in FIG. 1.

The method 900 includes collecting 902 interface information 110 and IP flow information 114. As discussed above, the interface information 110 can be collected from one or more interface monitors 112, and the interface information 110 can include information about interfaces within a plurality of edge routers 104 in a cloud provider network 102. The IP flow information 114 can be collected from one or more IP flow information collectors 116, and the IP flow information 114 can include information about IP flows that are being sent through the edge routers 104.

The interface information 110 can include log files (such as the log files 640 shown in FIG. 6) that include information about the interfaces within the edge routers 104. The log files can be generated by the edge routers 104 and made available to the traffic steering controller 108. The traffic steering controller 108 can process 904 the log files to determine hardware failure information (such as the hardware failure information 638 shown in FIG. 6). The hardware failure information can include information about hardware failures that have already occurred or that are likely to occur in the future in connection with the interfaces of the edge router 104.

At some point, the traffic steering controller 108 may determine 906, based at least in part on the hardware failure information, that an interface of the edge router 104 is likely to experience a hardware failure. For example, a log file could include information indicating that a hardware component within the interface is likely to fail within a short period of time.

In response to determining that the interface is likely to experience a hardware failure, the traffic steering controller 108 can use the IP flow information 114 to identify 908 one or more IP flows that are being routed through the interface. For each flow that is currently being routed through the interface, the traffic steering controller 108 can search 910 for another interface that has sufficient available capacity to accommodate the IP flow.

If the traffic steering controller 108 finds 912 another interface that belongs to the candidate pool 125 of available interfaces and that has sufficient available capacity to accommodate the IP flow, the traffic steering controller 108 can cause 914 the IP flow to be moved to the interface (e.g., by injecting routes into one or more edge routers 104 within the cloud provider network 102).

The interface to which the IP flow is moved can be located within the same edge router 104 as the interface that is likely to experience a hardware failure. In other words, the IP flow can be moved from one interface within an edge router 104 to another interface within the same edge router 104 (as shown in FIG. 2). Alternatively, the interface to which the IP flow is moved can be located within a different edge router 104. In other words, the IP flow can be moved from one interface within an edge router 104 to another interface within a different edge router 104 in a different geographical location (as shown in FIG. 3).

Figure 10:
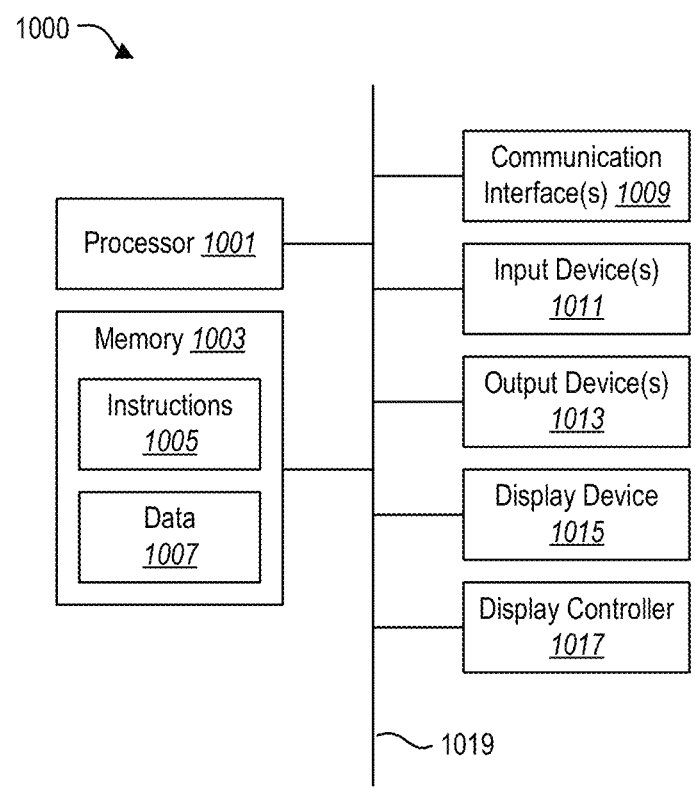
FIG. 10 illustrates certain components that can be included within a computing device.

One or more computing devices 1000 can be used to implement at least some aspects of the techniques disclosed herein. FIG. 10 illustrates certain components that can be included within a computing device 1000.

The computing device 1000 includes a processor 1001 and memory 1003 in electronic communication with the processor 1001. Instructions 1005 and data 1007 can be stored in the memory 1003. The instructions 1005 can be executable by the processor 1001 to implement some or all of the methods, steps, operations, actions, or other functionality that is disclosed herein. Executing the instructions 1005 can involve the use of the data 1007 that is stored in the memory 1003. Unless otherwise specified, any of the various examples of modules and components described herein can be implemented, partially or wholly, as instructions 1005 stored in memory 1003 and executed by the processor 1001. Any of the various examples of data described herein can be among the data 1007 that is stored in memory 1003 and used during execution of the instructions 1005 by the processor 1001.

Although just a single processor 1001 is shown in the computing device 1000 of FIG. 10, in an alternative configuration, a combination of processors (e.g., an ARM and DSP) could be used.

The computing device 1000 can also include one or more communication interfaces 1009 for communicating with other electronic devices. The communication interface(s) 1009 can be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 1002.11 wireless communication protocol, a Bluetooth® wireless communication adapter, and an infrared (IR) communication port.

A computing device 1000 can also include one or more input devices 1011 and one or more output devices 1013.

Some examples of input devices 1011 include a keyboard, mouse, microphone, remote control device, button, joystick, trackball, touchpad, and lightpen. One specific type of output device 1013 that is typically included in a computing device 1000 is a display device 1015. Display devices 1015 used with embodiments disclosed herein can utilize any suitable image projection technology, such as liquid crystal display (LCD), light-emitting diode (LED), gas plasma, electroluminescence, or the like. A display controller 1017 can also be provided, for converting data 1007 stored in the memory 1003 into text, graphics, and/or moving images (as appropriate) shown on the display device 1015. The computing device 1000 can also include other types of output devices 1013, such as a speaker, a printer, etc.

The various components of the computing device 1000 can be coupled together by one or more buses, which can include a power bus, a control signal bus, a status signal bus, a data bus, etc. For the sake of clarity, the various buses are illustrated in FIG. 10 as a bus system 1019.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system, comprising:
   one or more processors;
   memory in electronic communication with the one or more processors; and
   instructions stored in the memory, the instructions being executable by the one or more processors to:
   collect interface information about a plurality of interfaces within a plurality of edge routers in a network of a cloud computing provider, wherein the plurality of edge routers handle egress traffic from the network of the cloud computing provider to destinations that are external to the network of the cloud computing provider, wherein the plurality of interfaces are connected to a plurality of different networks operated by different Internet service providers, and wherein the interface information comprises telemetry about performance of the egress traffic through the plurality of interfaces;
   obtain Internet protocol (IP) flow information about a plurality of IP flows that are being sent through the plurality of interfaces, wherein the IP flow information comprises information about data rates of the plurality of IP flows;
   determine, based at least in part on the interface information, that a first interface is experiencing degraded performance;
   identify, based at least in part on the IP flow information, an IP flow that is being routed through the first interface and that has a data rate in excess of a threshold value;
   select a second interface from among a candidate pool of available interfaces that are not experiencing degraded performance;
   determine that the second interface has capacity for the IP flow; and
   cause the IP flow to be moved from the first interface to the second interface.

2. The system of claim 1, further comprising additional instructions that are executable by the one or more processors to prevent the first interface from being added to the candidate pool of available interfaces for a defined time period.

3. The system of claim 1, wherein determining that the first interface is experiencing the degraded performance comprises determining that the first interface is experiencing network congestion.

4. The system of claim 1, wherein determining that the first interface is experiencing the degraded performance comprises determining that a number of packet drops experienced by the first interface exceeds a threshold value.

5. The system of claim 1, wherein the interface information comprises a log file generated by an edge router that comprises the first interface, and wherein determining that the first interface is experiencing the degraded performance comprises:
   processing the log file; and
   determining, based at least in part on the log file, that the first interface has experienced a hardware failure.

6. The system of claim 1, further comprising additional instructions that are executable by the one or more processors to determine that a priority level of the IP flow exceeds a threshold priority level.

7. The system of claim 1, further comprising additional instructions that are executable by the one or more processors to:
   determine latency information about latency associated with various Internet paths; and
   determine, based at least in part on the latency information, that moving the IP flow to the second interface would not increase the latency of the IP flow.

8. The system of claim 1, wherein the first interface and the second interface are both included within a same edge router.

9. The system of claim 1, wherein:
   the first interface is included within a first edge router that is located in a first geographical location; and
   the second interface is included within a second edge router that is located in a second geographical location, the second geographical location being distinct from the first geographical location.

10. A method, comprising:
    collecting interface information about a plurality of interfaces within a plurality of edge routers in a network of a cloud computing provider, wherein the plurality of edge routers handle egress traffic from the network of the cloud computing provider to the Internet, wherein the plurality of interfaces are connected to a plurality of different networks operated by different Internet service providers, and wherein the interface information comprises telemetry about packet drops that have been experienced by the egress traffic through the plurality of interfaces;
    obtaining Internet protocol (IP) flow information about a plurality of IP flows that are being sent through the plurality of interfaces, wherein the IP flow information comprises information about data rates of the plurality of IP flows;
    determining that a number of packet drops experienced by a first interface within a time interval exceeds a packet drop threshold value;
    identifying, based at least in part on the IP flow information, an IP flow that is being routed through the first interface and that has a data rate in excess of a data rate threshold value;

selecting a second interface from among a candidate pool of available interfaces that are not experiencing degraded performance;

determining that the second interface has capacity for the IP flow;

causing the IP flow to be moved from the first interface to the second interface; and preventing the first interface from being added to the candidate pool of available interfaces for a defined time period.

11. The method of claim 10, wherein:

the interface information further comprises a log file generated by an edge router that comprises the first interface;

the method further comprises determining, based at least in part on the log file, that the first interface has experienced a hardware failure; and causing the IP flow to be moved from the first interface to the second interface is based at least in part on the hardware failure.

12. The method of claim 10, further comprising determining that a priority level of the IP flow exceeds a threshold priority level.

13. The method of claim 10, further comprising:

obtaining latency information about latency associated with various Internet paths; and determining, based at least in part on the latency information, that moving the IP flow to the second interface would not increase the latency of the IP flow.

14. The method of claim 10, wherein the first interface and the second interface are both included within a same edge router.

15. The method of claim 10, wherein:

the first interface is included within a first edge router that is located in a first geographical location; and the second interface is included within a second edge router that is located in a second geographical location, the second geographical location being distinct from the first geographical location.

16. A method, comprising:

obtaining log files corresponding to a plurality of interfaces within a plurality of edge routers in a network of a cloud computing provider, wherein the plurality of edge routers handle egress traffic from the network of the cloud computing provider to destinations that are external to the network of the cloud computing provider, wherein the plurality of interfaces are connected to a plurality of different networks operated by different Internet service providers;

processing the log files to determine hardware failure information;

determining, based at least in part on the hardware failure information, that a first interface of an edge router is likely to experience a hardware failure;

obtaining Internet protocol (IP) flow information corresponding to a plurality of IP flows that are being sent through the interfaces, wherein the IP flow information comprises information about data rates of the plurality of IP flows;

identifying, based at least in part on the IP flow information, an IP flow that is being routed through the first interface and that has a data rate in excess of a threshold value;

selecting a second interface from among a candidate pool of available interfaces that are not experiencing degraded performance;

determining that the second interface has capacity for the IP flow; and causing the IP flow to be moved from the first interface to the second interface.

17. The method of claim 16, further comprising preventing the first interface from being added to the candidate pool of available interfaces for a defined time period.

18. The method of claim 16, further comprising:

obtaining latency information about latency associated with various Internet paths; and determining, based at least in part on the latency information, that moving the IP flow to the second interface would not increase the latency of the IP flow.

19. The method of claim 16, wherein the first interface and the second interface are both included within a same edge router.

20. The method of claim 16, wherein:

the first interface is included within a first edge router that is located in a first geographical location; and the second interface is included within a second edge router that is located in a second geographical location, the second geographical location being distinct from the first geographical location.

* * * * *